United States Patent
Samoto et al.

(10) Patent No.: US 7,268,971 B2
(45) Date of Patent: Sep. 11, 2007

(54) MAGNETIC HEAD APPARATUS AND DRIVE APPARATUS INCLUDING MAGNETIC HEAD APPARATUS

(75) Inventors: Tetsuo Samoto, Miyagi (JP); Kazuya Hashimoto, Miyagi (JP); Eiji Nakashio, Miyagi (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 11/064,135

(22) Filed: Feb. 22, 2005

(65) Prior Publication Data

US 2005/0185322 A1   Aug. 25, 2005

(30) Foreign Application Priority Data

Feb. 24, 2004   (JP) ............................ P2004-048290

(51) Int. Cl.
  *G11B 5/31*   (2006.01)
(52) U.S. Cl. ........................................................ 360/90
(58) Field of Classification Search ................ 360/90, 360/261.1, 316–318
  See application file for complete search history.

(56) References Cited

U.S. PATENT DOCUMENTS

| | | | | |
|---|---|---|---|---|
| 4,465,248 A | * | 8/1984 | Rotter ...................... | 242/352.4 |
| 4,471,393 A | * | 9/1984 | Ishigo et al. ................... | 360/90 |
| 4,582,235 A | * | 4/1986 | Schulz ......................... | 226/20 |
| 6,826,020 B2 | * | 11/2004 | Daby et al. ................. | 360/317 |
| 6,970,332 B2 | * | 11/2005 | Tetsukawa et al. ....... | 360/324.1 |

FOREIGN PATENT DOCUMENTS

| | | |
|---|---|---|
| JP | 2002-352402 | 12/2002 |
| JP | 2004-039090 | 2/2004 |

* cited by examiner

*Primary Examiner*—Hoa T. Nguyen
*Assistant Examiner*—Mark Blouin
(74) *Attorney, Agent, or Firm*—Frommer Lawrence & Haug LLP; William S. Frommer

(57) ABSTRACT

A narrow magnetic body 66 in which outward path and inward path recording magnetic head devices 1WF and 1WR, capable of recording at least data on a metal evaporated type magnetic tape 51 running in the outward and inward direction and vice versa along the longitudinal direction, comprise the operation magnetic gaps GF and GR with the asymmetric structure is located at the leading side of the metal evaporated type magnetic tape 51. With this arrangement, magnetic field influence exerted by the narrow magnetic body can be decreased, and difference produced between magnetic recording and reproducing characteristics when the metal evaporated type magnetic tape is transported in the outward direction and in the inward direction can be decreased. Also, deteriorations of characteristics deteriorated by off-track upon reproduction can be improved. Thus, when the recording magnetic heads with the operation magnetic gaps having the asymmetric structure are in use and the metal evaporated type magnetic tape is transported in the outward and inward direction and vice versa, difference produced between magnetic recording and reproducing characteristics when the metal evaporated type magnetic tape is transported in the outward and inward direction and vice versa can be decreased. Also, deteriorations of characteristics deteriorated by off-track upon reproduction can be improved.

6 Claims, 8 Drawing Sheets

MAGNETIC HEAD APPARATUS AND DRIVE APPARATUS INCLUDING MAGNETIC HEAD APPARATUS

BACKGROUND OF THE INVENTION

1. Filed of the Invention

The present invention relates to a magnetic head apparatus using a metal evaporated type magnetic tape and a drive apparatus including a magnetic head apparatus.

2. Description of the Related Art

In recent years, in accordance with an explosive increase of a data amount, the increase of a storage capacity becomes the most urgent need in a tape-system storage system, and hence it is requested to increase a recording density to realize the above-mentioned increase of the storage capacity.

Under such circumstances, there is a trend that a so-called linear type magnetic recording tape system in which a magnetic tape is transported in the outward and inward direction and vice versa relative to a magnetic tape so as to record thereon data in a serpentine fashion is widely used increasingly.

However, in a magnetic tape formed of a coating type magnetic layer and which is now commercially available on the market, the increase of the recording density seems to reach its limit, and under the present circumstances, it cannot be expected that recording density will not be increased more than the present high recording density. For this reason, also in the linear type magnetic recording tape system, it has been discussed to use a so-called metal evaporated type magnetic tape for use in high recording density and if which magnetic layer is formed of a ferromagnetic metal evaporated film.

However, in the metal evaporated magnetic tape, its recording and reproducing characteristics become different depending upon the sliding direction in which a magnetic tape is slidably transported on a magnetic tape. The reason for this is that, since the magnetic layer is formed by rhombic vapor deposition of ferromagnetic metal, the magnetic layer has a rhombic pyramid structure to exhibit rhombic magnetic anisotropy.

So far there have been proposed metal evaporated type magnetic tapes in which difference between recording and reproducing characteristics in accordance with the sliding direction, that is, polarity can be improved (for example, see cited patent references 1, 2 and 3).

In these previously proposed metal evaporated type magnetic tapes, difference between recording and reproducing characteristics relative to the sliding direction can be improved by selecting factors of the magnetic layer, such as structure, film thickness and magnetic properties.

[Cited patent reference 1]: Official gazette of Japanese laid-open patent application No. 4-353621

[Cited patent reference 2]: Official gazette of Japanese laid-open patent application No. 4-353622

[Cited patent reference 3]: Official gazette of Japanese laid-open patent application No. 5-182168

In the linear type magnetic recording tape system, in order to increase the recording capacity more and to realize the higher recording density, it is requested to narrow the width of the recording track more. Concurrently therewith, it is requested to narrow the track width of the operation magnetic gap of the magnetic head. From these requests, as a recording magnetic head, there is used a thin film recording head having a microminiaturized structure that can be manufactured by a thin film technology in the semiconductor manufacturing technology.

In this thin film magnetic head, at least one of upper and lower magnetic cores comprising the operation magnetic gaps at their front portions is composed of a thin film magnetic layer, and the front portion comprising the operation magnetic gap of only one of the magnetic cores composed of the thin film magnetic layers is selected so as to have a narrow width having a target track width. In this manner, the magnetic core having the narrow front portion and the magnetic core having the wide front portion are opposed to each other to construct the operation magnetic gap, and the track width of the operation magnetic gap is determined by the narrow front portion. In the thin film magnetic head of this kind, while its operation magnetic gap has an asymmetric structure relative to the center surface, the track width is determined by the thin film magnetic layer processed with high accuracy and hence the track width of the operation magnetic gap can be microminiaturized with high accuracy.

Since the thin film recording head is manufactured with application of the thin film pattern technology used in the semiconductor manufacturing process as described above, a recording track width is accurate and it has less dispersions. Therefore, as compared with a conventional MIG (Metal in Gap) type magnetic head, this thin film magnetic head has an advantage such that it is suitable for the application to high-density tape systems such as a narrow track multi-channel linear system.

However, when data is recorded on the magnetic tape by the thin film head with the operation magnetic gap having the asymmetric structure as described above, complex magnetic fields are generated in the edge portion of the track width direction. Also, as mentioned hereinbefore, since the metal evaporated type magnetic tape has the rhombic anisotropy, when data is recorded on this magnetic tape, recording and reproducing characteristics of the thin film magnetic head and the metal evaporated type magnetic tape are inevitably changed so much during the magnetic tape is being transported in the outward and inward direction and vice versa.

Further, when data is recorded on the metal evaporated magnetic tape by the thin film magnetic head with the operation magnetic gap having the asymmetric structure, a problem arises, in which an S/N (signal-to-noise ratio) is considerably lowered by off-track in which the thin film magnetic head is shifted from the center of the track upon reproduction.

SUMMARY OF THE INVENTION

In view of the aforesaid aspect, it is an object of the present invention to provide a magnetic head apparatus and a drive apparatus including a magnetic head apparatus in which a problem in which magnetic recording and reproducing properties become different in the outward and inward transports of a magnetic tape can be solved and deteriorations of reproducing characteristics deteriorated when a reproducing magnetic tape is shifted from the center of a recording track due to off-track upon reproduction can be improved even when a recording magnetic head with an operation magnetic having an asymmetric structure and a metal evaporated type magnetic tape having rhombic magnetic anisotropy are in use.

It is another object of the present invention to provide a magnetic head apparatus and a drive apparatus including a magnetic head apparatus which make effective use of the fact that a magnetic recording head has a transport direction to provide excellent frequency characteristics and the fact that a metal evaporated type magnetic tape and a thin film magnetic recording head have a relative transport direction to decrease a difference between electromagnetic transduction characteristics.

According to an aspect of the present invention, there is provided a magnetic head apparatus which is comprised of a magnetic head main body including an outward path recording magnetic head device and an inward path recording magnetic head device for carrying out at least magnetic recording to form recording tracks on an outward path and an inward path of the outward and inward transport of a metal evaporated type magnetic tape along the longitudinal direction of the metal evaporated type magnetic tape while the metal evaporated magnetic tape is transported reciprocally in the longitudinal direction, wherein the recording magnetic head device is composed of opposing first and second magnetic bodies, the opposing first and second magnetic bodies having an operation magnetic gap formed between their front portions, the operation magnetic gap has an asymmetric structure in which a width of the front portion of the second magnetic body is selected to be narrower than that of the front portion of the first magnetic body, a track width of the operation magnetic gap being determined by a width of the front portion of the magnetic body and the outward path recording magnetic head device and the inward path recording magnetic head device are located in such a manner that the second magnetic body having the front portion with the narrow width is located on the leading side with respect to the direction of the outward path and the inward path of the metal evaporated type magnetic tape.

According to other aspect of the present invention, there is provided a drive apparatus including a transport drive unit for transporting a metal evaporated type magnetic tape in the outward and inward direction and vice versa and a magnetic head apparatus including magnetic head devices for recording and reproducing the metal evaporated type magnetic tape, comprising a magnetic head apparatus, the magnetic head apparatus comprising a magnetic head main body including an outward path recording magnetic head device and an inward path recording magnetic head device for carrying out at least magnetic recording to form recording tracks on an outward path and an inward path of the outward and inward transport of a metal evaporated type magnetic tape along the longitudinal direction of the metal evaporated type magnetic tape while the metal evaporated magnetic tape is transported in the outward and inward direction and vice versa along the longitudinal direction, wherein the recording magnetic head device is composed of opposing first and second magnetic bodies, the opposing first and second magnetic bodies having an operation magnetic gap formed between their front portions, the operation magnetic gap has an asymmetric structure in which a width of the front portion of the second magnetic body is selected to be narrower than that of the front portion of the first magnetic body, a track width of the operation magnetic gap being determined by a width of the front portion of the magnetic body and the outward path recording magnetic head device and the inward path recording magnetic head device are located in such a manner that the second magnetic body having the front portion with the narrow width is located on the leading side with respect to the direction of the outward path and the inward path of the metal evaporated type magnetic tape.

According to a further aspect of the present invention, in the above-mentioned drive apparatus including a magnetic head apparatus, the outward path recording magnetic head device and the inward path recording magnetic head device have the second magnetic bodies made of thin film magnetic material to form the operation magnetic gaps at their narrow front portions.

In accordance with yet a further aspect of the present invention, in the above-mentioned drive apparatus including a magnetic head apparatus, the magnetic head main body has a plurality of the outward path recording magnetic head devices and a plurality of the inward path recording magnetic head devices arrayed on parallel different straight lines with a predetermined spacing, the inward path reproducing magnetic head is formed on the side adjacent to the outward path recording magnetic head device in the portion where the outward path recording magnetic head device and the inward path recording magnetic head device are arrayed, the outward path reproducing magnetic head device is formed on the side adjacent to the inward path recording magnetic head device, the magnetic head main body is moved in the width direction of the metal evaporated type magnetic tape with respect to the outward path and the inward path, with respect to the outward path, the outward path recording magnetic head device-magnetically records data on a selected track and the outward path reproducing magnetic head on the selected track reproduces recorded data and with respect to the inward path, the inward path recording magnetic head device magnetically records data on other selected track and the inward path reproducing magnetic head device on the other selected track magnetically reproduces recorded data.

As described above, in the magnetic head apparatus and the drive apparatus according to the present invention, the recording magnetic head device capable of at least recording data includes one of the first and second magnetic bodies comprising the operation magnetic gap, that is, the second magnetic body having the asymmetric structure with the narrow width. In this manner, since only one magnetic body forms the operation magnetic gap structure with the asymmetric structure to determine the track width, the track width of the operation magnetic gap can be set to be narrow and accurate as mentioned before. Further, when the second magnetic body is composed of the thin film magnetic body, the narrow track width can be determined with higher accuracy.

Further, according to the present invention, in the recording magnetic head device with the operation magnetic gap having this asymmetric structure, the second magnetic body with the narrow width is located on the leading side with respect to the direction in which the recording magnetic head device is transported relative to the metal evaporated type magnetic tape, that is, the second magnetic body is located on the entrance side in which the metal evaporated type magnetic head enters into the recording magnetic head device. According to this arrangement, as is clear from the descriptions which will be made later on, even in the metal evaporated type magnetic tape having the rhombic magnetic anisotropy, degree between the electromagnetic transduction characteristics become different due to the transport direction of the metal evaporated type magnetic tape can be decreased. In addition, it is possible to improve deteriorations of the reproduced signal deteriorated when the reproducing magnetic head is shifted from the center of the recording track, that is, off-track occurs.

That is, according to the present invention, the high density recording can be realized by the magnetic gap with the asymmetric structure. In this case, it can be considered that the aforementioned problems encountered with the related art can be solved by alleviating both influence of distortion of the recording magnetic field produced at the edge portion of the track width direction by the second magnetic body with the narrow width comprising the operation magnetic gap and influence of polarity of evaporated particles produced by rhombic vapor-deposition.

DESCRIPTION OF THE PREFERRED EMBODIMENTS

A magnetic head apparatus and a drive apparatus including a magnetic head apparatus according to embodiments of the present invention will be described below.

Figure 1:
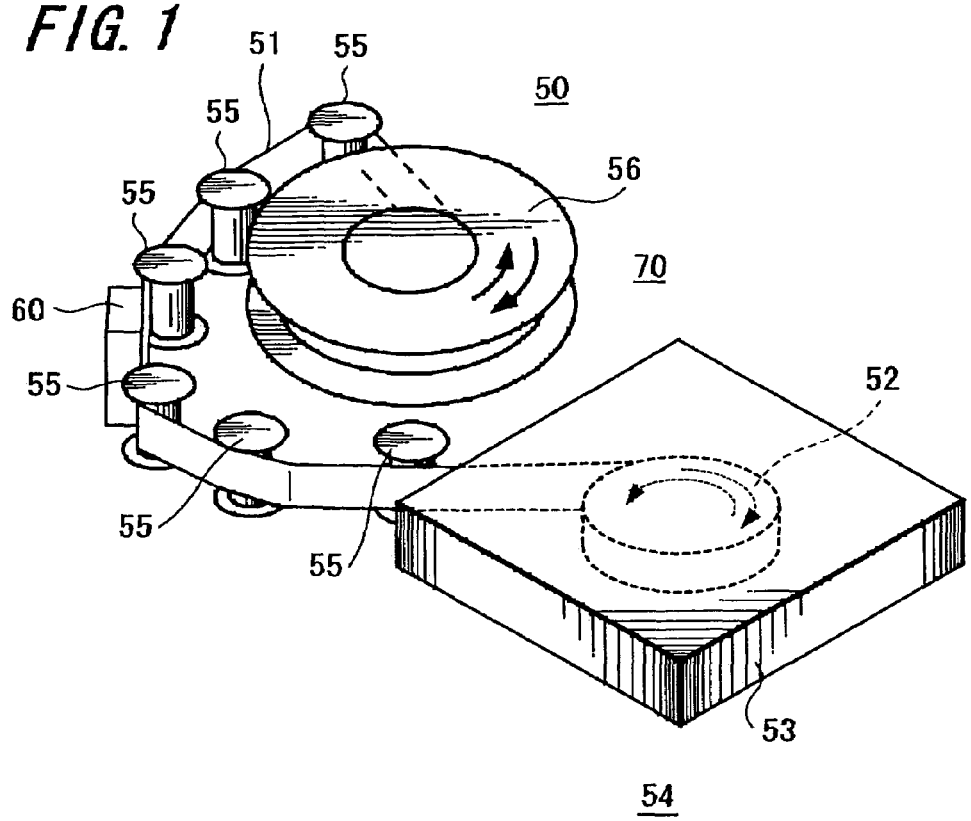
FIG. 1 is a perspective view schematically showing an arrangement of a drive apparatus according to an embodiment of the present invention.

FIG. 1 is a perspective view schematically showing an arrangement of a drive, apparatus according to the present invention, for example, the case in which the present invention is applied to a linear tape drive apparatus for use with a data storage system of a computer system.

A linear tape drive apparatus, generally depicted by reference numeral 50 in FIG. 1 according to the present invention, includes a magnetic head apparatus 60 according to the present invention and a transport drive portion 70 to transport a metal evaporated type magnetic tape 51 in front of the magnetic head apparatus 60 in the outward and inward direction and vice versa.

This transport drive portion 70 includes a tape cassette loading portion 54 of a tape cassette 53 having a first winding portion 52, a guide means including a guide body 55 such as a guide pin and a guide roller for guiding the metal evaporated type magnetic tape 51 supplied from the tape cassette 53 into the magnetic head apparatus 60, a second winding portion 56 located at the outside of the tape cassette 53 for winding the metal evaporated type magnetic tape 51 and rotary drive units (not shown) of the first and second winding portions 52 and 56 for transporting the metal evaporated type magnetic tape 51 in the outward direction and inward direction and vice versa along its longitudinal direction between the first and second winding portions 52 and 56.

Figure 2:
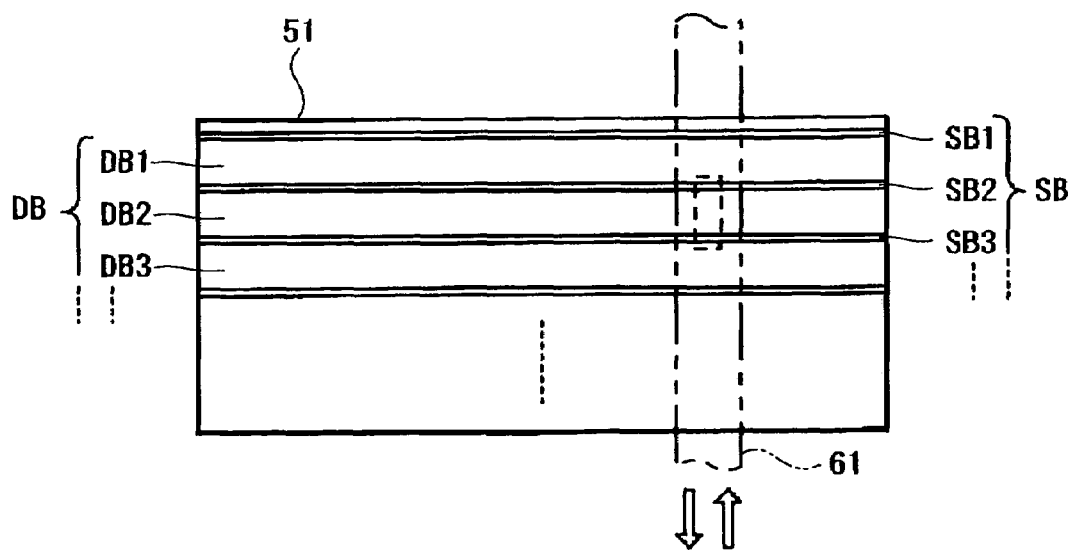
FIG. 2 is a schematic diagram showing an example of a format of a magnetic tape according to the present invention.

FIG. 2 is a diagram schematically showing an example of a format of the metal evaporated type magnetic tape 51. As shown in FIG. 2, a plurality of servo bands SB (SB1, SB2, SB3, . . . ) extending along the longitudinal direction of the metal evaporated type magnetic tape 51 are arrayed with a predetermined interval along the tape width direction, and a plurality of data bands DB (DB1, DB2, DB3, . . . ) are formed across these servo bands SB.

A large number of data tracks are arranged on these data bands DB in parallel to each other along the longitudinal direction of the metal evaporated type magnetic tape 51.

Figure 3:
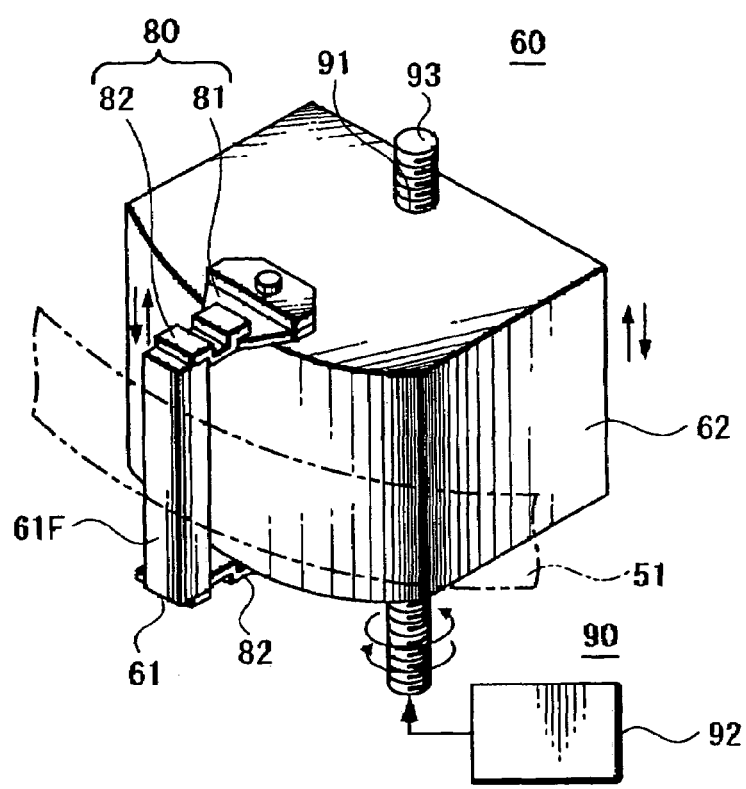
FIG. 3 is a perspective view schematically showing an arrangement of a magnetic head apparatus according to an embodiment of the present invention.

FIG. 3 is a perspective view schematically showing an arrangement of an example of the magnetic head apparatus 60 according to the present invention. As shown in FIG. 3, this magnetic head apparatus 60 includes a magnetic head main body 61 on which there are mounted a recording magnetic head device and a reproducing magnetic head device.

This magnetic head main body 61 is supported on a supporting body 62 through a fine following mechanism 80 by which the magnetic head main body 61 can be fine moved in the width direction of the metal evaporated type magnetic head 51.

This supporting body 62 can be coarsely moved in the width direction of the metal evaporated type magnetic tape 51 by a coarse following mechanism 90.

Figure 4:
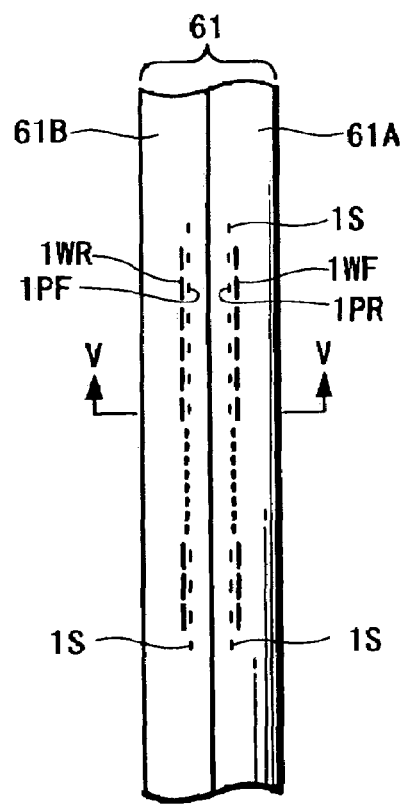
FIG. 4 is a schematic front view showing a main portion of a magnetic head main body of the magnetic head apparatus according to the present invention.

FIG. 4 is a schematic front view of the magnetic head main body 61. As shown in FIG. 4, the magnetic head main body 61 comprises an outward path recording magnetic head device 1WF and an inward path recording magnetic head device 1WR arrayed on the outward path and the inward path of the outward and inward transport direction for recording data in the recording tracks of the above-mentioned data band DB of the metal evaporated type magnetic tape transported in the outward and inward direction along the longitudinal direction of the metal evaporated type magnetic tape 51 and an outward path reproducing magnetic head device 1PF and an inward path reproducing magnetic head device 1PR for reproducing these tracks. This magnetic head main body 61 further includes servo signal reproducing magnetic head devices 1S for reproducing servo signals recorded on the servo bands SB recorded across the data bands DB located above and below the portions in which the outward path recording magnetic head device 1WF, the inward path recording magnetic head device 1WR, the outward path reproducing magnetic head device 1PF and the inward path reproducing magnetic head device 1PR are arranged.

The length of the magnetic head main body 61 is selected to be more than twice the width of the metal evaporated type magnetic tape 51. When the magnetic head device arrangement portion of the magnetic head main body 61 is moved across all of the data bands DB and the servo bands SB of the metal evaporated type magnetic tape 51 by the coarse following mechanism 90, the magnetic head main body 61 is moved across the whole width of the metal evaporated type magnetic tape 51 and it can be moved stably and satisfactorily without producing unequal stress on the metal evaporated type magnetic tape 51. The arrangement portion of the above-mentioned magnetic head devices 1S, 1WF, 1PF, 1WR, 1PR is formed at the central portion of the magnetic head main body 61.

Figure 5:
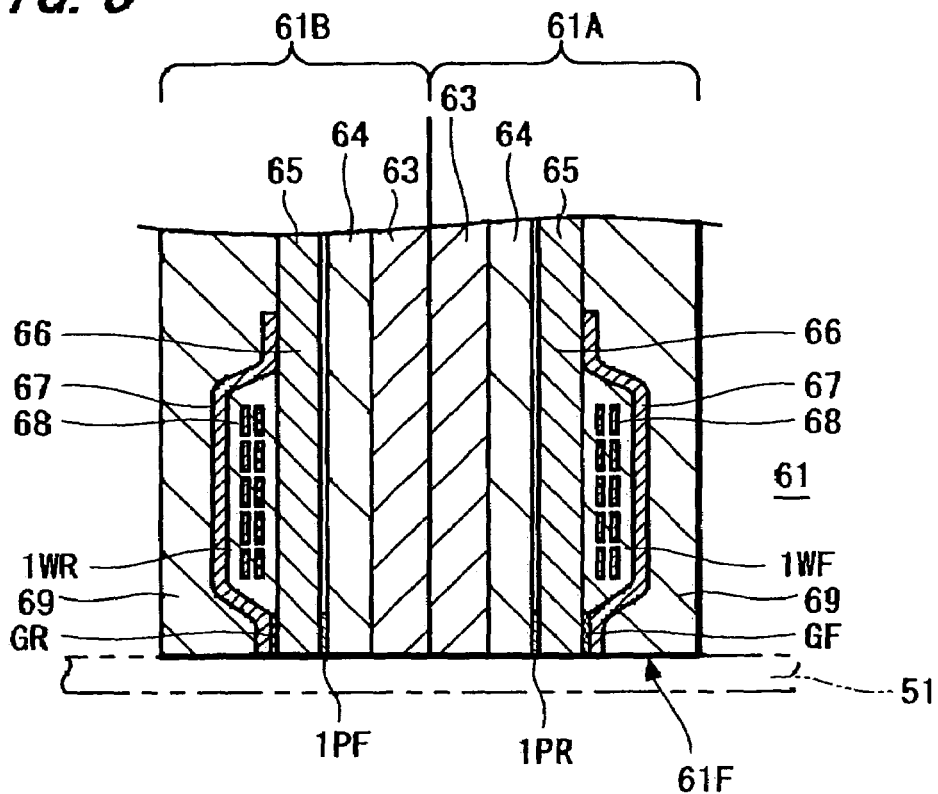
FIG. 5 is a cross-sectional view taken along the line V-V in FIG. 4 and shows a main portion of an example of the magnetic head main body of the magnetic head apparatus according to the present invention.

FIG. 5 is a cross-sectional view taken along the line V-V in FIG. 4. As shown in FIG. 5, the magnetic head main body 61 is formed by bonding first and second half portions 61A and 61B, for example.

The first half portion 61A and the second half portion 61B include AlTiC substrates 63, for example, on which the above-mentioned magnetic head devices 1S, 1WF, 1PF, 1WR and 1PR are arranged. As shown in FIG. 5, for example, the outward path reproducing magnetic head device 1PR and the inward path recording magnetic head device 1WF are laminated on a substrate 63A of the first half portion 61A, in that order. At the same time the reproducing magnetic head device 1PR, for example, is formed, the servo signal reproducing magnetic head device 1S is formed. Also, the outward path reproducing magnetic head device 1PF and the inward path recording magnetic head device 1WR are laminated on a substrate 63B of the second half portion 61B, in that order. At the same time the reproducing magnetic head device 1PF, for example, is formed, the servo signal reproducing magnetic head device 1S is formed.

The outward path and inward path recording magnetic head devices 1WF and 1WR can be composed of electromagnetic induction type magnetic heads formed of thin film devices, and the outward path and inward path reproducing magnetic head devices 1PF and 1PR can be composed of magnetoresistive devices (MR devices), for example.

The outward path reproducing magnetic head device 1PR and the inward path reproducing magnetic head device 1PF can be composed of a magnetoresistive type magnetic head element including a magnetoresistive (MR) device disposed between a lower magnetic layer 64 and an upper magnetic layer 65 formed of a magnetic layer made of a suitable material such as permalloy and sendust formed on the substrates 63, for example. The servo signal reproducing magnetic head device 1S can be composed of the magnetoresistive type magnetic head device at the same time the outward path reproducing magnetic head device 1PR and the inward path reproducing magnetic head device 1PF are formed.

Then, the outward path recording magnetic head device 1WF and the inward path recording magnetic head device 1WR, each of which is formed of a thin film magnetic head, are formed on the inward path reproducing magnetic head device 1PR and the outward path reproducing magnetic head device 1PF.

These recording magnetic head devices 1WF and 1WR have a first magnetic body 66 and a second magnetic body 67 laminated with each other through nonmagnetic layers so as to serve magnetic cores to form operation magnetic gaps GF and GR between the front portions thereof.

Also, a thin film coil 68 comprising, for example, a head winding is disposed between the first and second magnetic bodies 66 and 67.

In this case, the first magnetic body 66 can serve both as the first magnetic body 66 and the upper magnetic layer 65.

Then, in the outward path recording magnetic head device 1WF and the inward path recording magnetic head device 1WR, at least the second magnetic body 67 is formed of a thin film magnetic body.

Protecting films 69 are deposited on the respective recording magnetic head devices 1WF and 1WR by sputtering alumina, for example.

Laminated head portions composed of a plurality of reproducing magnetic head device 1PF, 1PR and recording magnetic head devices 1WF, 1WR arranged in the direction perpendicular to the sheet of the drawing of FIG. 5 are arranged on the first and second half portions 61A and 61B along the track width direction of the metal evaporated type magnetic tape 51.

The first and second half portions 61A and 61B are bonded by their substrates 63 and thereby formed as one body to construct the magnetic head device main body 61.

In this state, as shown in FIG. 4, a plurality of outward path recording magnetic head devices 1WF and a plurality of inward path recording magnetic head elements 1WR are arranged on two parallel straight lines with a predetermined spacing.

These outward path recording magnetic head devices 1WF and these inward path recording magnetic head devices 1WR are arranged on the same data track, for example, in parallel to each other. The inward path reproducing magnetic head devices 1PR is parallelly located on the side adjacent to the outward path recording magnetic head device 1WF between the outward path recording magnetic head device 1WF and the inward path recording magnetic head device 1WR which are located in parallel to each other. The outward path reproducing magnetic head device 1PF is parallelly located on the side adjacent to the inward path recording magnetic head device 1WR between the outward path recording magnetic head device 1WF and the inward path recording magnetic head device 1WR which are located in parallel to each other.

In this arrangement, a front surface 61F of the magnetic head main body 61 serves as the transport surface of the metal evaporated type magnetic tape 51, that is, the surface along which the metal evaporated type magnetic tape 51 is transported in slidable contact with the magnetic head main body 61 or in an opposing fashion to the magnetic head main body 61.

Figure 6:
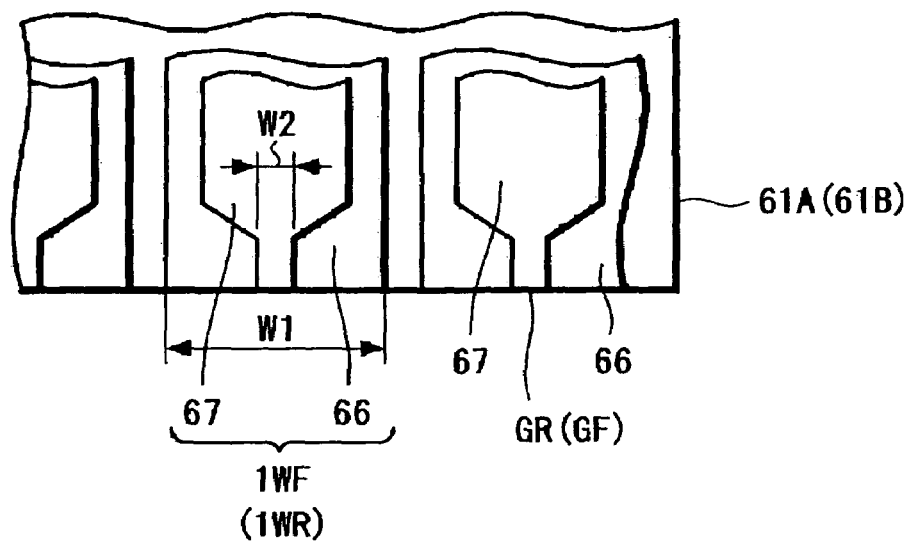
FIG. 6 is a schematic diagram showing a flat surface pattern of a recording magnetic head of the magnetic head apparatus according to the present invention.

FIG. 6 is a schematic diagram showing a flat surface pattern of the recording magnetic heads of the magnetic head apparatus according to the present invention. In the above-mentioned arrangement, as shown in FIG. 6, a width of the front portion comprising the operation magnetic gap GF or GR of the recording magnetic head device 1WF or 1WR formed of the thin film magnetic head is selected to be a width W1 sufficiently larger than the track width of the operation magnetic gap GF or GR with respect to the first magnetic body 67 of the lower layer and it is selected to be a width W2 corresponding to the target track width of the operation magnetic gap GF or GR with respect to the second magnetic body 67 of the upper layer formed of at least the thin film magnetic layer. The track width of the operation magnetic gap GF or GR is determined by the width W2 of the front portion of the second magnetic body 67.

As described above, the operation magnetic gaps GF and GR have an asymmetric structure narrowed with the width W2 of the front portion of the second magnetic body 67.

Then, as mentioned above, the magnetic head main body 61 is attached to the supporting body 62 through the fine following mechanism 80.

As shown in FIG. 3, this fine following mechanism 80 comprises a pair of bimorph elements 81, one ends of which are fixed to the supporting body 62 with a predetermined spacing, for example (only one bimorph element 81 is shown in FIG. 3).

As shown in FIG. 3, the magnetic head main body 61 is bonded at its respective ends of the track width direction to the free ends of these bimorph elements 81 through an attachment member 82.

On the other hand, as shown in FIG. 3, the coarse following mechanism 90 includes a tapped hole 91 bored on the supporting body 62 along the track width direction and a rotary screw shaft 93 reciprocally rotated by a rotary driving portion 92 formed of a suitable means such as a stepping motor. The supporting body 62 can be moved in the track width direction, that is, it can be rotatably moved in the width direction of the metal evaporated type magnetic tape 51. Also, the supporting body 62 can be moved in the track width direction as the rotary shaft 93 is rotated by the rotary driving portion 92.

In this manner, the supporting body 62 can be fine moved in the width direction of the metal evaporated type magnetic tape 51 by the coarse following mechanism 90, whereby the magnetic head device arrangement portion of the magnetic head main body 61 can be brought to the position of the target data band DB and the position of the servo band SB at both sides of the data band DB of the metal evaporated type magnetic tape 51. Thus, the recording magnetic head devices 1WF and 1WR can be coarsely adjusted so as to reach the positions of the selected data tracks when the metal evaporated type magnetic tape 51 is transported in the outward and inward direction and vice versa.

Tracking errors are detected by the servo signal read out from the track of the metal evaporated type magnetic tape 51 by the servo signal reproducing magnetic head device 1S, whereby the magnetic head main body 61 is fine adjusted with application of a control signal voltage to the bimorph elements 81 of the fine following mechanism 80 and the respective recording magnetic head devices 1WF and 1WR and reproducing magnetic head devices 1PF and 1PR can be accurately set to the centers of the data tracks upon tracking adjustment.

According to this magnetic head apparatus, when the metal evaporated type magnetic tape 51 is transported in the outward path during it is transported in the outward and inward direction and vice versa, data is magnetically recorded on the selected track by the outward path recording magnetic head device 1WR of the magnetic head main body 61. Subsequently, the thus recorded data is reproduced for monitoring by the outward path reproducing magnetic head device 1PF on the selected track.

Then, when the metal evaporated type magnetic tape 51 is transported in the inward path, as mentioned above, the magnetic head main body 61 is moved in the track width direction (tape width direction) and data is magnetically recorded on other selected tracks by the inward path recording magnetic head device 1WR. Subsequently, the thus recorded data is reproduced for monitoring by the inward path reproducing magnetic head devices 1PR on other selected tracks.

According to the present invention, in the magnetic head apparatus having the above-mentioned arrangement, for example, the side of the second magnetic body 67 with the narrow front portion comprising the operation magnetic gaps GF and GR having asymmetric structures comprising the recording magnetic heads 1WF and 1WR is located on the leading side, that is, the entrance side in which the metal evaporated type magnetic tape 51 is entered into the magnetic head device.

Next, characteristics of the recording magnetic head apparatus having the above-mentioned arrangement according to the present invention will be described below.

In this case, a mechanism in which remanent magnetization is generated when recording magnetic fields produced from the magnetic gaps with the asymmetric structures in which the front portions of the first and second magnetic bodies 66 and 67 are different in width act on the metal evaporated type magnetic tape having rhombic magnetic anisotropy is extremely complex. Therefore, the characteristics of the recording magnetic head apparatus according to the present invention will be described with reference to measured results of recording and reproducing characteristics relative to the metal evaporated type magnetic tape with the rhombic magnetic anisotropy, more specifically, frequency characteristics, input and output characteristics, etc.

A single layer metal evaporated type magnetic tape having a 55 nm-thick magnetic layer should be used as a magnetic tape and a thin film magnetic head device with an asymmetric structure having a track width of 2.75 μm and a gap length of 0.30 μm should be used as a recording magnetic head device and an MR (magnetoresistive) head having a track width of 7 μm and a gap length of 0.23 μm should be used as a reproducing magnetic head device until otherwise specified. Recording and reproducing characteristics of the recording magnetic head device and the reproducing magnetic head device were measured by a so-called drum tester. More specifically, the above-mentioned single layer metal evaporated type magnetic tape was wound around a rotary drum, the rotation directions of the recording magnetic head device and the reproducing magnetic head device were selected and the sliding operations of the respective operation magnetic gaps of the above-mentioned recording magnetic head device and reproducing magnetic head device were measured.

Figure 7A:
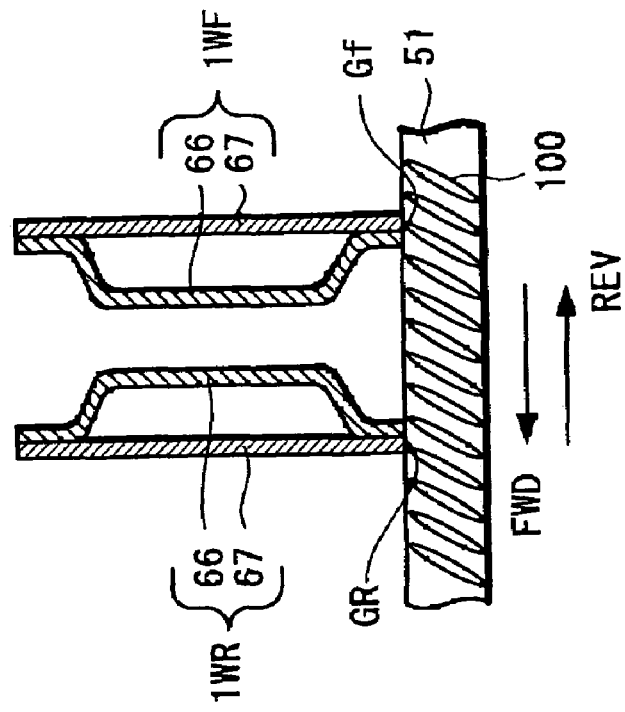
FIGS. 7A and 7B are diagrams to which reference will be made in explaining operations of recording magnetic heads according to the present invention and shows relationships among a type A recording magnetic head and the transport direction of the metal evaporated type magnetic head and a type B recording magnetic head and the transport direction of the metal evaporated type tape, respectively.
Figure 7B:
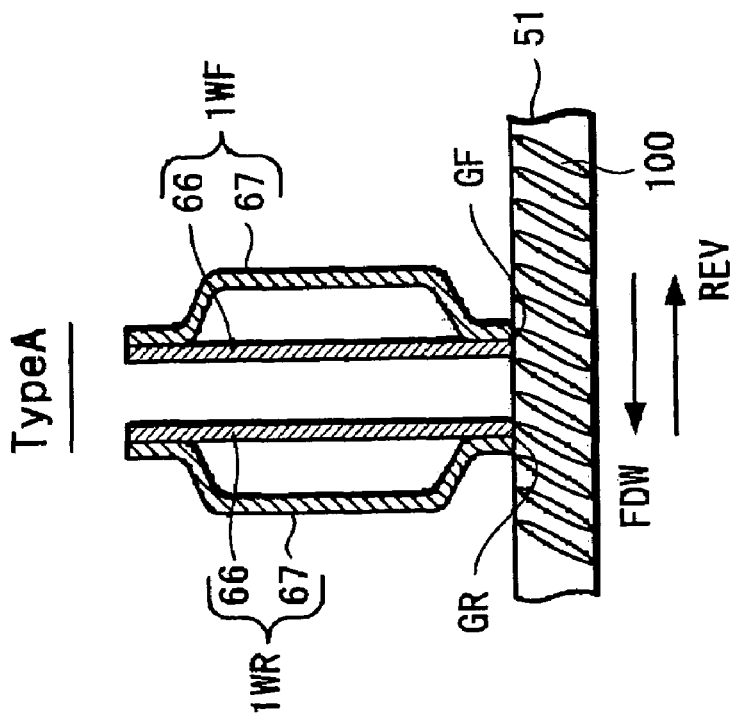

Recording and reproducing characteristics of the recording magnetic head apparatus were measured in consideration of the relationship between the outward path magnetic head device 1WF, the inward path magnetic head device 1WR and the metal evaporated type magnetic tape 51 schematically shown in FIGS. 7A and 7B.

In this case, the running direction of the metal evaporated type magnetic tape 51 is assumed as follows. That is, the transport direction in which the magnetic head devices 1WF and 1WR are transported relative to the direction (hereinafter referred to as a "forward direction") extending along the inclination of columns 100 of the metal evaporated type magnetic tape 51 is assumed to be an outward path transport direction FWD. Also, the transport direction in which the magnetic head devices 1WF and 1WR are transported relative to the opposite direction (hereinafter referred to as a "reverse direction") extending along the inclination of columns 100 of the metal evaporated type magnetic tape 51 is assumed to be an inward path transport direction REV.

FIG. 7A shows the layout corresponding to the above-mentioned arrangement of the present invention. More specifically, the second magnetic bodies 67 with narrow front portions, of the outward path recording magnetic head device 1WF and the inward path magnetic head device 1WR, for determining the track widths of their magnetic gaps GF and GR are both located at the outside, that is, they are located at the leading sides with respect to the outward path and the inward path (hereinafter this layout will be referred to as a "type A").

On the other hand, conversely to FIG. 7A, FIG. 7B shows the case in which the second magnetic bodies 67 with the narrow front portions of the outward path recording magnetic head device 1WF and the inward path magnetic head device 1WR are both located on the inside. In FIG. 7B, elements and parts identical to those of FIG. 7A are denoted by identical reference numerals and therefore need not be described. More specifically, the outward path and inward path recording magnetic head devices 1WF and 1WR are located on the trailing side with respect to the transport directions of the outward path and the inward path of the metal evaporated type magnetic tape 51 (hereinafter this layout will be referred to as a "type B").

In FIG. 7B, if the inward path recording magnetic head device 1WR is used as the outward path recording magnetic head device and the outward path recording magnetic head device 1WF is used as the inward path recording magnetic head device, then with respect to the outward path and the inward path, the second magnetic bodies 67 are located on the leading side.

However, in actual practice, when data is recorded on the metal evaporated type magnetic tape 51 by the recording magnetic head device 1WR, for example, the reproducing magnetic head devicet for monitoring recorded data should be located on the rear stage side with respect to the transport of the tape. To this end, a thin film magnetic head device comprising the recording magnetic head device should be formed on the same substrate 63 on which the above-mentioned recording magnetic head device 1WR is formed and a magnetoresistive type magnetic head device comprising the reproducing magnetic head device should be formed on the thin film magnetic head device.

However, when the recording magnetic head device and the reproducing magnetic head device are laminated on the common substrate, both of the recording magnetic head device and the reproducing magnetic head device are located too close to each other, which is not practical in actual use.

Therefore, according to the arrangement of the present invention, the type A schematically shown in FIG. 7A becomes a representing example.

FIGS. 8 to 13 are diagrams showing characteristic curves obtained when characteristics of reproduced outputs of the magnetic heads are measured by the aforementioned drum tester.

In this case, under the conditions in which the magnetic tape having the above-mentioned rhombic magnetic anisotropy is wrapped around the rotary drum, the magnetic head device is brought in slidable contact with this magnetic tape and the rotation direction of the rotary drum and the layout of the magnetic head devices, etc. are selected, characteristics of the type A recording magnetic head and the type B recording magnetic head were measured.

Figure 8:
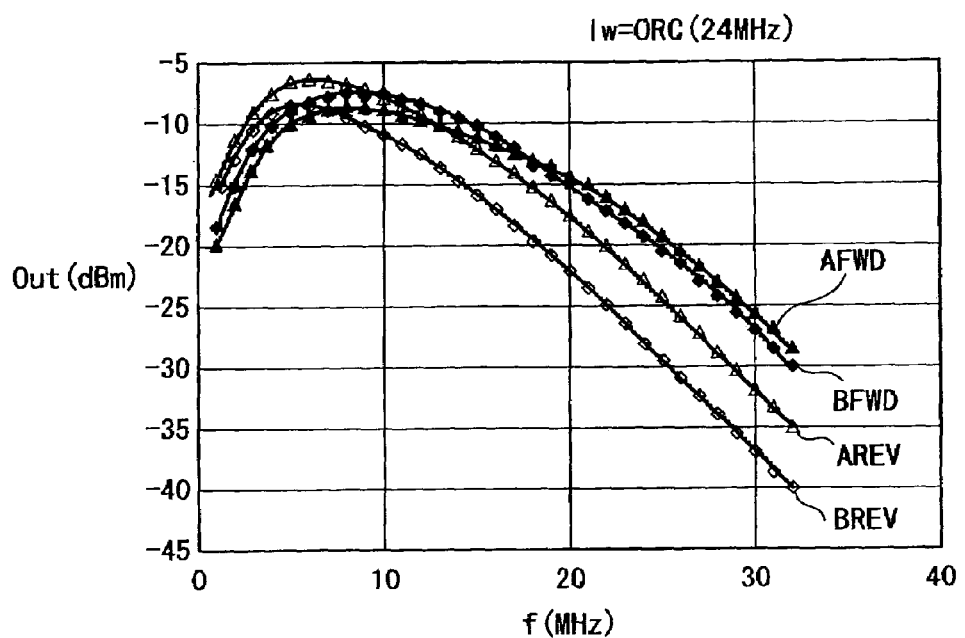
FIG. 8 is a diagram showing characteristic curves obtained when frequency characteristics of reproduced outputs from the type A recording magnetic head and the type B recording magnetic head are measured.

FIG. 8 is a diagram showing characteristic curves obtained when frequency characteristics of the type A recording magnetic head and the type B recording magnetic head, that is, changes of outputs relative to frequencies were measured. In this case, a recording current Iw was selected to be an optimum recording current value ORC (Optimum Recording Current) at a recording frequency of 24 MHz.

Figure 9:
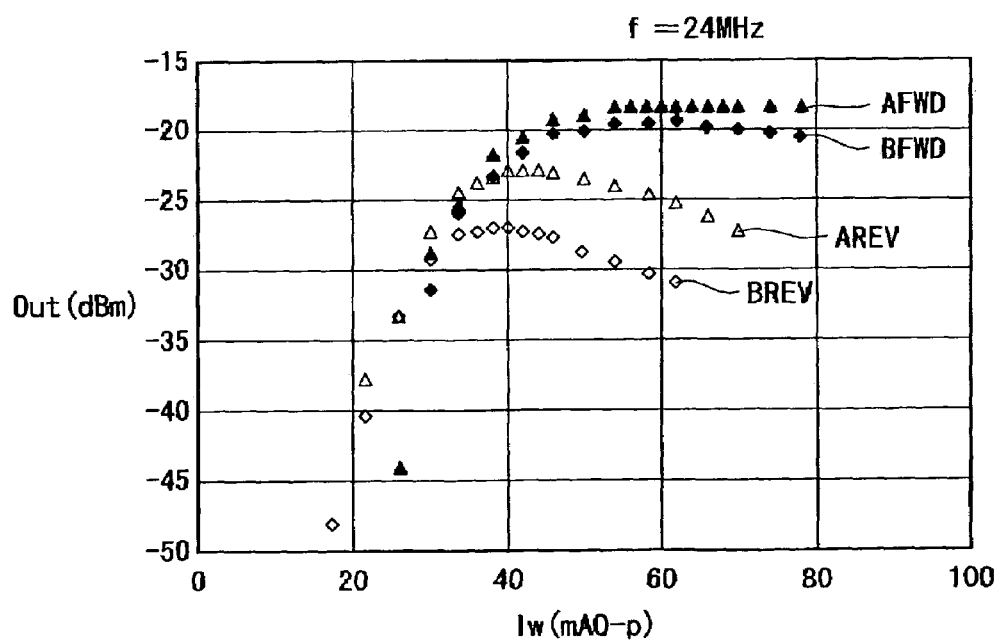
FIG. 9 is a diagram showing characteristic curves obtained when recording current dependences of reproduced outputs from the type A recording magnetic head and the type B recording magnetic head.

FIG. 9 is a diagram showing characteristic curves obtained when input and output characteristics, that is, recording current dependences of reproduced outputs from the type A recording magnetic head and the type B recording magnetic head, similarly. That is, the recording current I2 is exhibited as $[mA_{0-p}]$ (zero-to-peak current value).

In FIGS. 8 and 9, solid triangles AFWD and open triangles AREV show characteristics plotted when data was recorded on and reproduced from the metal evaporated type magnetic tape 51 running in the FWD direction by the outward path recording magnetic head device 1WF in the type A magnetic head and characteristics plotted when data was recorded on and reproduced from the metal evaporated type magnetic tape 51 running in the REV direction by the inward path recording magnetic head 1WR.

Also, solid squares BFWD and open squares BREV show characteristics plotted when data is recorded on and reproduced from the metal evaporated type magnetic tape 51 running in the FWD direction by the outward path magnetic head device 1WF in the type B magnetic head and characteristics plotted when data is recorded on and reproduced from the metal evaporated type magnetic tape 51 running in the REV direction by the inward path recording magnetic head device 1WR in the type B magnetic head.

A study of FIG. 8 reveals that the frequency characteristic of the type A magnetic head is approximately 2 dB and which is excellent as compared with that of the type B magnetic head and that the reproduced output thereof is increased 2 dB in the forward direction and is also increased 5 dB in the reverse direction. That is, when the metal evaporated type magnetic tape having the rhombic magnetic anisotropy is in use, the frequency characteristic can be improved, particularly, in the reverse direction.

A study of FIG. 9 reveals that the optimum recording current of the type A magnetic head is substantially equal to that of the type B magnetic head during the metal evaporated type magnetic tape is transported in the forward direction and that the above-mentioned optimum recording current is increased 10% during the metal evaporated type magnetic tape is transported in the reverse direction.

As described above, according to the arrangement of the type A magnetic head of the present invention, frequency characteristics and recording and reproducing characteristics can be improved even in the inward path transport which becomes the reverse direction, for example.

Further, when the present invention is applied to a so-called multi-channel linear system in which a large number of magnetic head devices are arrayed in the track width direction as described above, the type A magnetic head can decrease a difference between electromagnetic transduction characteristics obtained when the metal evaporated type magnetic tape is transported in the forward direction and the reverse direction.

Therefore, signal processing in the above-mentioned recording and reproducing channels can be executed by a circuit having similar characteristics in the forward and reverse directions and hence a simple magnetic recording system can be constructed.

Also, it is possible to realize an inexpensive system.

Further, according to the arrangement of the present invention, recording and reproducing characteristics deteriorated upon off-track can be improved.

Figure 10:
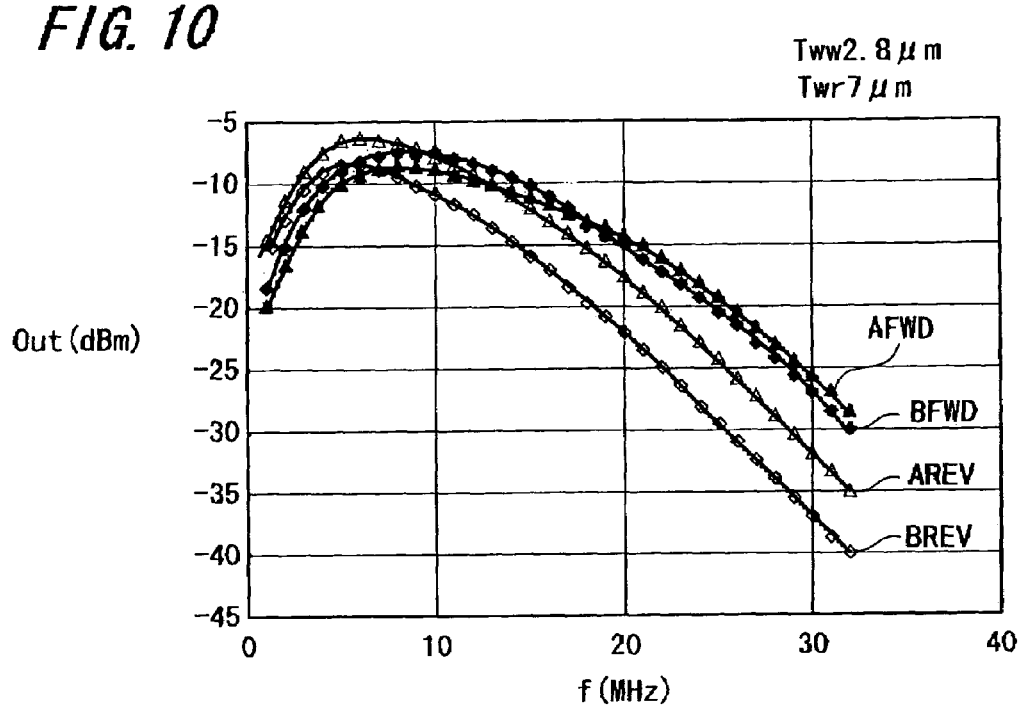
FIG. 10 is a diagram showing characteristic curves obtained when frequency characteristic curves of the reproduced outputs from the type A recording magnetic head and the type B recording magnetic head under the condition in which the reproduced track width is made larger than the recording track width.
Figure 11:
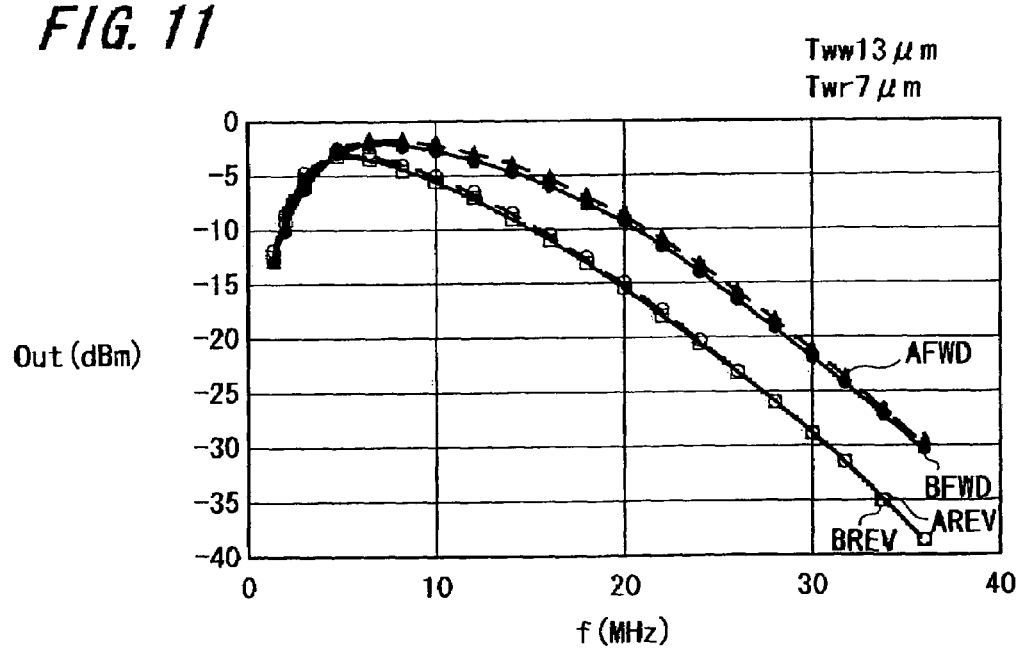
FIG. 11 is a diagram showing characteristic curves obtained when recording current dependences of reproduced outputs from the type A recording magnetic head and the type B recording magnetic head under the condition in which the reproduced track width is made smaller than the recording track width.

FIGS. 10, 11, 12 and 13 are diagrams showing characteristic curves obtained when frequency characteristics and recording current dependences of reproduced outputs in the case in which the narrow thin film magnetic core (second magnetic body 67) comprising the above-mentioned operation magnetic gap is located at the leading side with respect to the metal evaporated type magnetic tape 51 like the type A magnetic head with the arrangement according to the present invention and in the case in which the narrow thin film magnetic core (second magnetic body 67) comprising the above-mentioned operation magnetic gap is located at the trailing side with respect to the metal evaporated type magnetic tape 51 like the type B magnetic head with the arrangement according to the present invention under the conditions in which a relationship between a recording track width Tww and a reproducing track width Twr is selected to be Tww<Twr, for example, Tww=2.8μ and Twr=7μ and in which the above-mentioned relationship is selected to be Tww>Twr, for example, Tww=13 μm and Twr=7 μm, respectively. In FIGS. 10 and 11, the recording current Im is selected to be the optimum current value at a frequency of 24 MHz. Further, in FIGS. 12 and 13, the recording current Im is exhibited as [$mA_{p-p}$] (peak-to-peak current value).

In FIGS. 10, 11, 12 and 13, solid triangles AFWD and open triangles AREV show characteristics plotted when data is recorded on and reproduced from the metal evaporated type magnetic tape 51 running in the FWD direction by the outward path recording magnetic head device 1WF in the type A magnetic head and when data is recorded on and reproduced from the metal evaporated type magnetic tape 51 running in the REV direction by the inward path recording magnetic head 1WR in the type A magnetic head.

Also, in FIGS. 10, 11, 12 and 13, solid squares BFWD and open squares BREV show characteristic plotted when data is recorded on and reproduced from the metal evaporated type magnetic tape 51 running in the FWD direction by the outward path recording magnetic head device 1WF in the type B magnetic head and when data is recorded on and reproduced from the metal evaporated type magnetic tape 51 running in the REV direction by the inward path recording magnetic head 1WR in the type B magnetic head.

Figure 12:
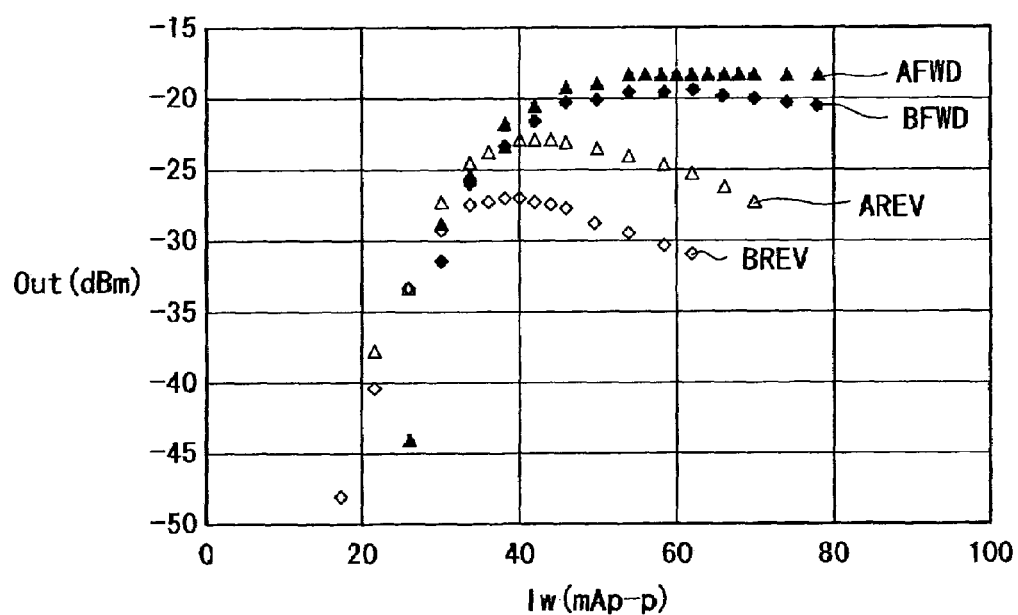
FIG. 12 is a diagram showing characteristic curves obtained when recording current dependences of reproduced outputs from the type A recording magnetic head and the type B recording magnetic head under the condition in which the reproduced track width is made larger than the recording track width.
Figure 13:
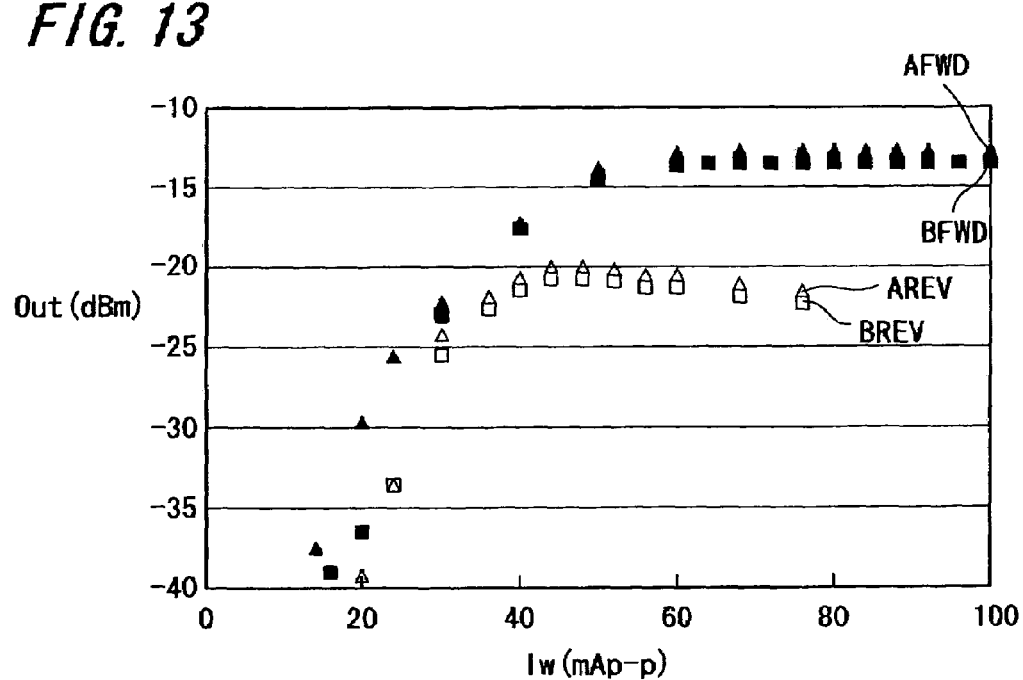
FIG. 13 is a diagram showing characteristic curves obtained when recording current dependences of reproduced outputs from the type A recording magnetic head and the type B recording magnetic head are measured under the condition in which the reproduced track width is made smaller than the recording track width.

As is clear from the comparison with FIGS. 10 and 11 and the comparison with FIGS. 12 and 13, when the reproducing track width is made smaller than the recording track width (Tww>Twr), the influence of the magnetic field distortions produced in the track width direction by the narrow thin film magnetic core (second magnetic body) having the operation magnetic gap with the asymmetric structure can be improved by the reduced reproduced track width.

Figure 14:
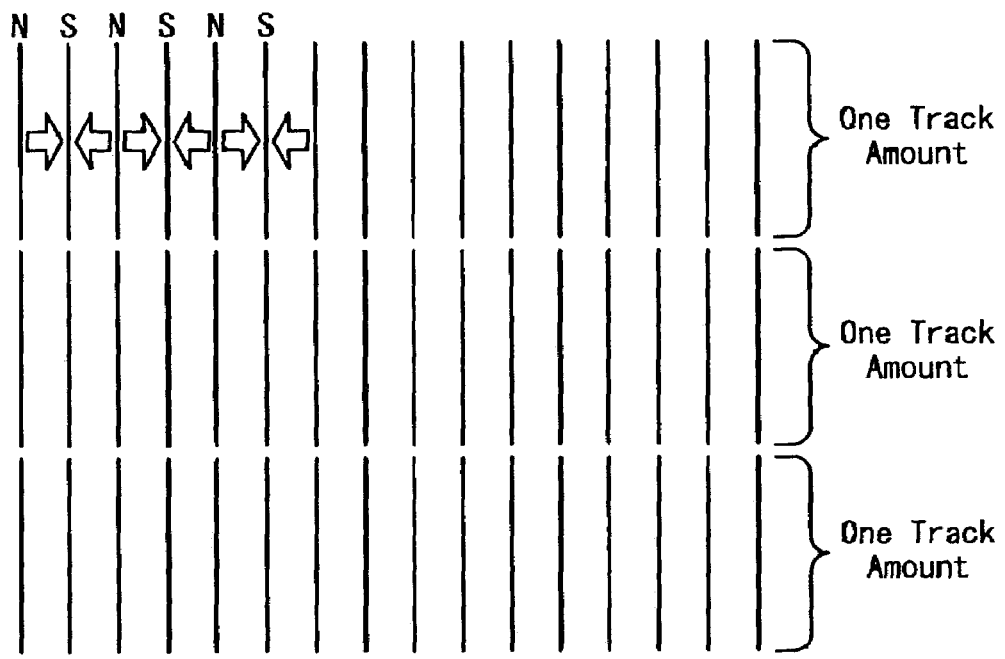
FIG. 14 is a schematic diagram showing a recorded pattern obtained by the type A recording magnetic head through a magnetic force microscope (MFM)
Figure 15:
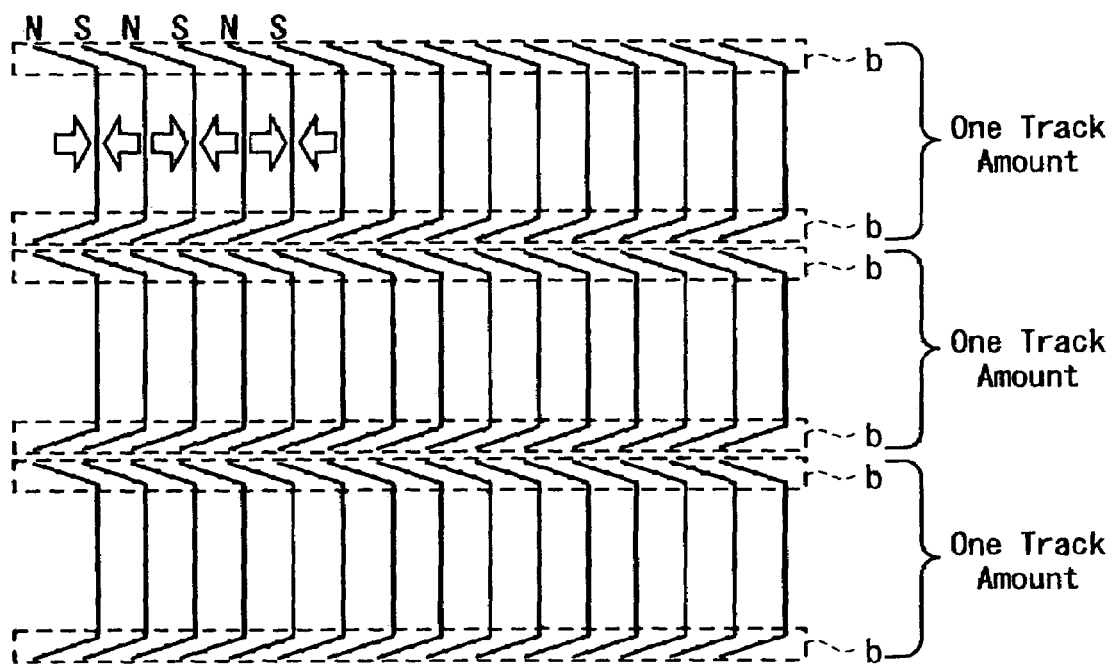
FIG. 15 is a schematic diagram showing a recorded pattern obtained by the type B recording magnetic head through the magnetic force microscope (MFM).

Then, recording patterns obtained by the above-mentioned type A magnetic head and type B magnetic head were observed by an MFM (magnetic force microscope). FIGS. 14 and 15 are pattern diagrams schematically showing the observed patterns. In this case, the recording track width of the recording magnetic head is selected to be 5.2 μm.

As described above, when the narrow thin film magnetic core (second magnetic body 67) of the magnetic gap is located at the leading side and the wide magnetic core (first magnetic layer 66) is located at the trailing side, as shown in FIG. 14, the recording tracks are formed as patterns without distortion up to the edge portion of the track width direction. Conversely, when the narrow thin film magnetic core (second magnetic body 67) of the magnetic gap is located at the trailing side, the distortion of this edge portion exerts an influence upon the recording tracks and hence the edge portions of the width direction of the recording tracks are bent as shown by broken lines b in FIG. 15.

From the above descriptions, according to the type A magnetic head, the recording tracks are correctly formed over the whole area of the track width. However, according to the type B head, the bent recording patterns exist at both sides of the track width and hence it can be considered that output is decreased the amount corresponding to the amount decreased by the bent recording track patterns. This is caused by magnetization left when the metal evaporated type magnetic tape having easy axis of magnetization in the slanting direction is applied with complex recording magnetic fields.

From the above-mentioned results, it is to be understood that the thin film magnetic recording head with the magnetic gap with the asymmetric structure has excellent frequency characteristics and outputs depending upon the running direction thereof. Thus, when the recording head is set in the direction of the type A magnetic head like the present invention, it is possible to construct a magnetic recording system with excellent frequency characteristics and outputs.

Also, as is clear from the above descriptions, a difference between the transport directions can be decreased upon off-track and it is possible to construct a system which is strong against the off-track.

While the present invention is applied to the magnetic head with the asymmetric structure mainly in the thin film magnetic head as set forth above, the present invention is not limited thereto and can also be applied to the case in which the metal evaporated type magnetic tape is used in various kinds of recording magnetic heads with operation magnetic gaps having asymmetric structures. Thus, it is needless to say that the present invention can be applied to the magnetic head apparatus and the drive apparatus including the magnetic head apparatus according to the above-mentioned embodiments.

As described above, in the magnetic head apparatus and the drive apparatus according to the present invention, the recording magnetic head device capable of at least recording data includes one of the first and second magnetic bodies comprising the operation magnetic gap, that is, the second magnetic body having the asymmetric structure with the narrow width. In this manner, since only one magnetic body forms the operation magnetic gap structure with the asymmetric structure to determine the track width, the track width of the operation magnetic gap can be set to be narrow and accurate as mentioned before. Further, when the second magnetic body is composed of the thin film magnetic body, the narrow track width can be determined with higher accuracy.

Further, according to the present invention, in the recording magnetic head device with the operation magnetic gap having this asymmetric structure, the second magnetic body with the narrow width is located on the leading side with respect to the direction in which the recording magnetic head device is transported relative to the metal evaporated type magnetic tape, that is, the second magnetic body is located on the entrance side in which the metal evaporated type magnetic head enters into the recording magnetic head device. According to this arrangement, as is clear from the descriptions which will be made later on, even in the metal evaporated type magnetic tape having the rhombic anisotropy, degree between the electromagnetic transduction characteristics become different due to the transport direction of the metal evaporated type magnetic tape can be decreased.

In addition, it is possible to improve deteriorations of the reproduced signal deteriorated when the reproducing magnetic head is shifted from the center of the recording track, that is, off-track occurs.

That is, according to the present invention, the high density recording can be realized by the magnetic gap with the asymmetric structure. In this case, it can be considered that the aforementioned problems encountered with the related art can be solved by alleviating both influence of distortion of the recording magnetic field produced at the edge portion of the track width direction by the second magnetic body with the narrow width comprising the operation magnetic gap and influence of polarity of evaporated particles produced by rhombic vapor-deposition.

Having described preferred embodiments of the invention with reference to the accompanying drawings, it is to be understood that the present invention is not limited to those precise embodiments and that various changes and modifications could be effected therein by one skilled in the art without departing from the spirit or scope of the invention as defined in the appended claims.

What is claimed is:

1. A magnetic head apparatus comprising:
a magnetic head main body including an outward path recording magnetic head device and an inward path recording magnetic head device for carrying out at least magnetic recording to form recording tracks on an outward path and an inward path of the outward and inward transport of a metal evaporated type magnetic tape along the longitudinal direction of said metal evaporated type magnetic tape while said metal evaporated magnetic tape is transported in the outward and inward direction and vice versa along the longitudinal direction, wherein
said recording magnetic head device is composed of opposing first and second magnetic bodies, said opposing first and second magnetic bodies having an operation magnetic gap formed between their front portions,
said operation magnetic gap has an asymmetric structure in which a width of said front portion of said second magnetic body is selected to be narrower than that of said front portion of said first magnetic body, a track width of said operation magnetic gap being determined by a width of the front portion of said magnetic body, and
said outward path recording magnetic head device and said inward path recording magnetic head device are located in such a manner that said second magnetic body having said front portion with the narrow width is located on the leading side with respect to the direction of the outward path and the inward path of said metal evaporated type magnetic tape.

2. A magnetic head apparatus according to claim 1, wherein said outward path recording magnetic head device and said inward path recording magnetic head device have said second magnetic bodies made of thin film magnetic material to form said operation magnetic gaps at their narrow front portions.

3. A magnetic head apparatus according to claim 1, wherein
said magnetic head main body has a plurality of said outward path recording magnetic head devices and a plurality of said inward path recording magnetic head devices arrayed on parallel different straight lines with a predetermined spacing,
said inward path reproducing magnetic head is formed on the side adjacent to said outward path recording magnetic head device in the portion where said outward path recording magnetic head device and said inward path recording magnetic head device are arrayed,
said outward path reproducing magnetic head device is formed on the side adjacent to said inward path recording magnetic head device,
said magnetic head main body is moved in the width direction of said metal evaporated type magnetic tape with respect to said outward path and said inward path, with respect to said outward path, said outward path recording magnetic head device magnetically records data on a selected track and said outward path reproducing magnetic head on said selected track reproduces recorded data, and
with respect to said inward path, said inward path recording magnetic head device magnetically records data on other selected track and said inward path reproducing magnetic head device on said other selected track magnetically reproduces recorded data.

4. A drive apparatus including a transport drive unit for transporting a metal evaporated magnetic tape in the outward and inward direction and vice versa and a magnetic head apparatus including magnetic head devices for recording and reproducing said metal evaporated magnetic tape, comprising a magnetic head apparatus, said magnetic head apparatus comprising a magnetic head main body including an outward path recording magnetic head device and an inward path recording magnetic head device for carrying out at least magnetic recording to form recording tracks on an outward path and an inward path of the outward and inward transport of a metal evaporated type magnetic tape along the longitudinal direction of said metal evaporated type magnetic tape while said metal evaporated magnetic tape is transported in the outward and inward direction and vice versa along the longitudinal direction, wherein
said recording magnetic head device is composed of opposing first and second magnetic bodies, said opposing first and second magnetic bodies having an operation magnetic gap formed between their front portions,
said operation magnetic gap has an asymmetric structure in which a width of said front portion of said second magnetic body is selected to be narrower than that of said front portion of said first magnetic body, a track width of said operation magnetic gap being determined by a width of the front portion of said magnetic body, and
said outward path recording magnetic head device and said inward path recording magnetic head device are located in such a manner that said second magnetic body having said front portion with the narrow width is located on the leading side with respect to the direction of the outward path and the inward path of said metal evaporated type magnetic tape.

5. A drive apparatus including a magnetic head apparatus according to claim 4, wherein said outward path recording magnetic head device and said inward path recording magnetic head device have said second magnetic bodies made of thin film magnetic material to form said operation magnetic gaps at their narrow front portions.

6. A drive apparatus including a magnetic head apparatus according to claim 4, wherein
    said magnetic head main body has a plurality of said outward path recording magnetic head devices and a plurality of said inward path recording magnetic head devices arrayed on parallel different straight lines with a predetermined spacing,
    said inward path reproducing magnetic head is formed on the side adjacent to said outward path recording magnetic head device in the portion where said outward path recording magnetic head device and said inward path recording magnetic head device are arrayed, said outward path reproducing magnetic head device is formed on the side adjacent to said inward path recording magnetic head device,
    said magnetic head main body is moved in the width direction of said metal evaporated type magnetic tape with respect to said outward path and said inward path,
    with respect to said outward path, said outward path recording magnetic head device magnetically records data on a selected track and said outward path reproducing magnetic head on said selected track reproduces recorded data, and
    with respect to said inward path, said inward path recording magnetic head device magnetically records data on other selected track and said inward path reproducing magnetic head device on said other selected track magnetically reproduces recorded data.

* * * * *